United States Patent [19]

Headington

[11] Patent Number: 4,759,913

[45] Date of Patent: Jul. 26, 1988

[54] RECOVERY OF LIQUID PHASES FROM THREE PHASE EMULSIONS FORMED IN SOLVENT EXTRACTION PROCESSES

[75] Inventor: Thomas A. Headington, New Orleans, La.

[73] Assignee: Freeport Research and Engineering Company, New Orleans, La.

[21] Appl. No.: 38,726

[22] Filed: Apr. 15, 1987

[51] Int. Cl.[4] ............................................. C0G 43/00
[52] U.S. Cl. .................................. 423/10; 423/2; 423/8; 210/520
[58] Field of Search ........................... 423/6, 8, 10, 2; 210/520

[56] References Cited

U.S. PATENT DOCUMENTS

| | | | |
|---|---|---|---|
| 4,180,545 | 12/1979 | McCullough et al. | 423/8 |
| 4,302,427 | 11/1981 | Berry et al. | 423/10 |
| 4,303,620 | 12/1981 | Rendall et al. | 423/6 |
| 4,424,195 | 1/1984 | Korchnak et al. | 423/10 |
| 4,503,022 | 3/1985 | Majumdar | 423/6 X |
| 4,514,365 | 4/1985 | Weterings et al. | 423/8 X |
| 4,519,985 | 5/1985 | Wells et al. | 423/6 |
| 4,643,882 | 2/1987 | Floreancig | 423/8 |

Primary Examiner—Peter A. Nelson
Attorney, Agent, or Firm—Fisher, Christen & Sabol

[57] ABSTRACT

A process for the recovery of an organic phase and an aqueous phase from three phase emulsions such as those formed during the extraction of uranium from wet phosphoric acid is described. Such emulsions contain a light-density liquid phase and a heavy-density liquid phase and are stabilized by a solid phase of intermediate density. The emulsion is first heated and then separated into its three components using a centrifugal filter with an appropriate filter aid. At high filter feed rates the dense liquid phase passes freely through the filter media while the light phase liquid begins to accumulate in the centrifuge and is withdrawn from the centrifuge via a properly positioned skimmer tube. The apparatus containing the skimmer tube is also described.

18 Claims, 2 Drawing Sheets

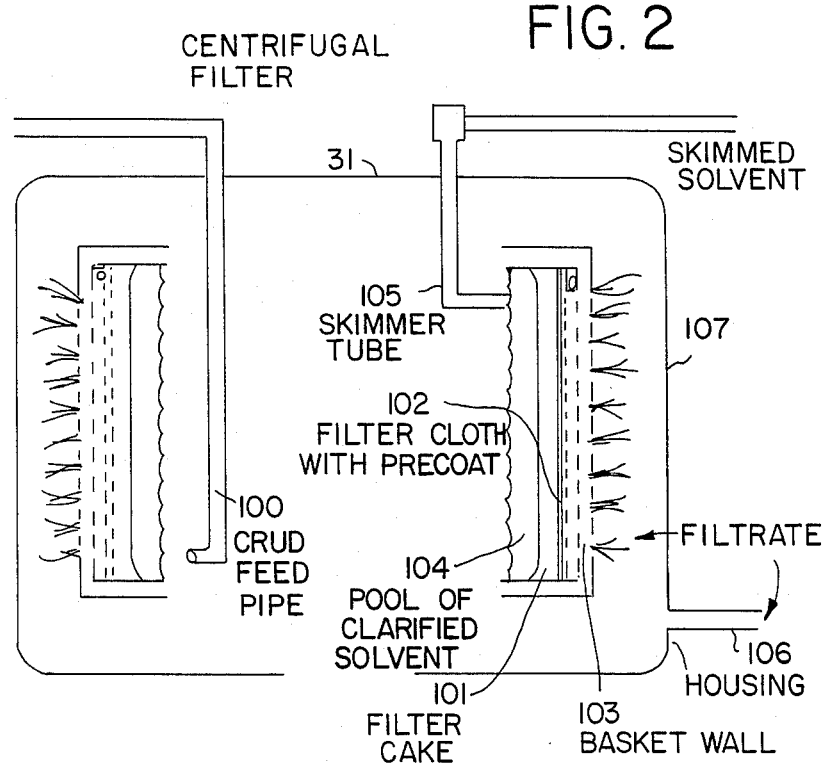
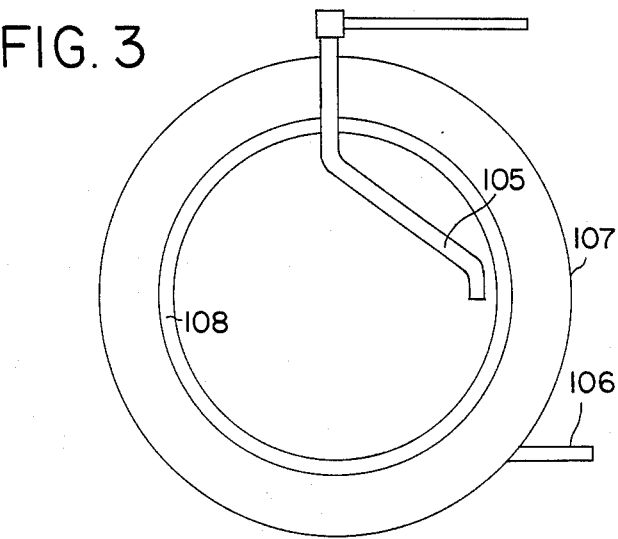

RECOVERY OF LIQUID PHASES FROM THREE PHASE EMULSIONS FORMED IN SOLVENT EXTRACTION PROCESSES

BACKGROUND OF THE INVENTION

1. Field of the Invention

The present invention relates to a process and an apparatus for the recovery of liquid phases from three phase emulsions. More specifically the invention relates to a process and an apparatus for the recovery of organic extractant and phosphoric acid from stable emulsions formed during the extraction of uranium from wet-process phosphoric acid.

2. Description of the Background Art

Wet process phosphoric acid is produced by reacting phosphate rock with sulfuric acid. The major reaction products include phosphoric acid and calcium sulfate (gypsum) which are separated by filtration. The 30 percent $P_2O_5$ phosphoric acid stream from the filtration operation contains other constituents, including uranium, which can be recovered via solvent extraction at this point in the process. The uranium-free 30 percent $P_2O_5$ phosphoric acid is then concentrated by evaporation to about 54 percent which is the concentration at which the merchant grade acid is sold. The uranium extracted from the 30 percent $P_2O_5$ phosphoric acid stream is sold as a by-product.

Depending on the source, phosphate rock contains various natural organic impurities. Other organic impurities can be imparted to the phosphate rock during pretreatment operations. Some of the organic impurities pass through the gypsum filter cake and report to the 30 percent $P_2O_5$ phosphoric acid stream described above. These impurities, commonly referred to as humates or humic acids, are responsible for creating and stabilizing emulsions formed when phosphoric acid is mixed with solvent in the uranium solvent extraction process. The emulsions, known in the industry as "cruds", not only create processing problems but also contribute substantially to the uranium production costs by increasing solvent losses.

The cruds are three-phase emulsions consisting of a "light" or light-density liquid phase, a "heavy" or heavy-density liquid phase and a solid phase. The light-density liquid phase, which can be referred to as the "solvent", the "organic", or the "organic extractant", is composed of active ingredients which are dissolved in an inert diluent. In the case of uranium extraction from phosphoric acid, the active ingredients are di-2-ethyl-hexyl phosphoric acid, which is commonly referred to as DEHPA, and tri-octyl-phosphine-oxide, which is commonly referred to as TOPO. These active ingredients are dissolved in the inert diluent which is, typically, kerosene. This light-density phase typically has a density of about 0.83. The high density liquid phase, which is normally referred to as the "aqueous" or acid phase, is usually an acid or base leach solution. In the case of uranium extraction from phosphoric acid the aqueous component of crud is phosphoric acid. This heavy-density phase typically has a density of about 1.3. Both of these liquid phases of crud are of economic value to the processing facility and it is, therefore, desirable to recover these liquids. The solid phase is composed of organic and inorganic solids. The organic solids include the humates discussed above which typically display an effective density, when wet, of that between the two liquid phases. Once separated from the liquid phases, washed free of any solvent, and removed from any filter aid, crud solids are tar-like and composed of about 80 percent carbonaceous matter with the remaining portion including $P_2O_5$, residual moisture, and inorganic solids.

Crud solids in the emulsion have small particle sizes and a gelatinous characteristic. These characteristics of crud solids cause filtration rates of crud to be too low to effectively utilize either pressure or vacuum filtration of large quantities of these solids. The relatively low density of the solid phase of crud does not allow a continuous decanter centrifuge to effectively process crud. Such centrifuges can contiuously discharge heavy, dense solids by throwing such solids against the wall of the centrifuge chamber. Crud solids are not dense enough for such a procedure. The characteristics of crud solids prevent the formation of distinct solid-liquid interfaces during centrifugation in such machines.

Other types of continuous centrifuges such as nozzle or disk centrifuges or those described in U.S. Pat. No. 4,424,195 to Korchnak et al. cannot achieve three phase separation of crud. The separation products from such centrifuges consist of a clear overflow of solvent and an underflow of a mixture of acid, solvent, and solids. Since the solids can only be effectively discharged in slurry form, solvent recovery is not maximized and the acid is not discharged as a clear liquid from these centrifuges. Also, the use of these centrifuges in a crud processing system provides poor results because excessive wear rapidly occurs in the centrifuges. This rapid wear occurs because of the high speeds of operation of these centrifuges. These centrifuges can operate at speeds from 4000 to 6000 revolutions per minute (RPM). Pluggage by the tar-like, carbonaceous crud solids occurs in the ports and chambers of these centrifuges.

Solid bowl or imperforate basket centrifuges equipped with internal skimmer tubes have been used successfully to make liquid-solid separation in two phase systems. In such applications, where the solids are more dense than the liquid, the solids are thrown against the centrifuge wall, while a pool of clarified liquid accumulates within the centrifuge. If the liquid is not of value, it is usually allowed to accumulate to a sufficient depth to overflow the centrifuge basket lip. This method of continuous liquid discharge results in splashing and some of the liquid is lost through the bottom solids discharge chute of the centrifuge basket. If the liquid is of value it can be removed via an internal skimmer tube. Such a machine can be used to achieve the desired separation with three phase emulsions such as cruds. However, commercial success is limited by the ability to continuously remove the heavy phase liquid once the separation has been achieved. Also, the solids must be discharged in slurry form thereby removing excessive amounts of acid and solvent.

Chemical treatment methods, as described in U.S. Pat. No. 4,190,633 entitled "Crud Handling Circuit" to Smith et al. commonly assigned with this invention, offer alternative methods to mechanical separation with centrifuges. In some plant facilities, however, it is not feasible to use chemical treatment methods because of difficulties in disposing of the additional chemical residue.

The industry has recognized the problems associated with recovering the solvent and acid from crud and has, therefore, sought to minimize the problem by removing crud-forming matter from the phosphoric acid prior to any uranium extraction process. Several methods of removing crud-forming matter from phosphoric acid have been developed. U.S. Pat. No. 4,087,512 to Reese et al. discloses an attempt to minimize the formation of stable emulsions, that are caused by humic acids in wet process phosphoric acid feed, by a pretreatment with an inexpensive hydrocarbon. Such hydrocarbons can include kerosene, gasoline, benzene, and toluene. In this process the acid and hydrocarbon are mixed and then transferred to a three phase separator where, after a few minutes, free acid and solvent separate leaving behind the stable emulsion which contains the hydrocarbon, acid, and crud forming solids.

The Reese et al. process discussed above and similar processes can, in varying degrees, reduce solvent losses and other downstream problems associated with crud formation. However, even the most effective of the existing commercial processes cannot totally eliminate crud generation. Thus, the need for an efficient solvent recovery process exists within the industry. Such a process can have the benefit of precluding the need for expensive acid clean-up systems. The industry, therefore, requires a process by which solvent and acid can be efficiently recovered from crud formed during the recovery of uranium from phosphoric acid, and equipment to perform this process.

SUMMARY OF THE INVENTION

The invention is a process for recovering two liquid phases from an emulsified suspension of particles. The invention comprises the steps of mixing a filter aid into an emulsion with the emulsion having a light-density liquid, a heavy-density liquid and a solid. Centrifuging the emulsion in a centrifugal filter having a filter surface is performed at sufficient speed to collect the solid on the filter and to separate the light-density liquid from the heavy-density liquid with the heavy-density liquid being passed through the filter surface. Desirably the light density liquid is continuously removed from within the centrifuge via a properly positioned skimmer tube. If a skimmer tube is not used, physically separating or removing the light-density liquid from the heavy-density liquid is then performed by other mechanical means.

This process can comprise the contacting of a filter aid with an emulsion either by mixing the filter aid into the emulsion or using the filter aid as a precoat. The emulsion is formed from a light-density solvent, a heavy-density acid and a solid. The process includes feeding the emulsion to a centrifugal filter. The centrifugal filter has (1) a housing wall with at least one stationary exit pipe affixed to the wall, (2) a cylindrical basket having a perforated cylinder wall wherein the cylindrical basket is adapted to rotate within the housing wall and to hold a filter cloth within the perforated cylinder wall, and (3) a skimmer tube projecting into the rotatable cylindrical basket that has an end juxtaposed to the filter cloth or material contained thereon. The invention then includes centrifuging the emulsion in the centrifugal filter at a speed sufficient to (1) provide about 600 to about 1300 g's of centrifugal force, (2) separate the light-density solvent from the heavy-density acid, and (3) pass the heavy-density acid through the perforated cylinder wall to the housing wall, and (4) remove the light-density liquid through the internal skimmer tube. Collecting can then simultaneously occur for the light-density solvent and the heavy-density acid external to the centrifuge while the solids are retained on the filter cloth. The speed of the centrifugal filter in the preferred embodiment, relative to a rate of feeding of the emulsion, is also less than sufficient to pass the light-density solvent through the perforated cylinder. In the preferred embodiment the invention further includes collecting simultaneously the light-density solvent through the skimmer tube, the heavy-density acid through the stationary exit pipe, and the solid on the filter cloth.

The preferred apparatus of the invention includes a centrifugal filter that has an "internal skimmer tube" positioned in such a manner that the lighter density liquid phase, such as the solvent in uranium extraction processes, is continuously withdrawn from the chamber of the centrifugal filter. This invented apparatus prevents the lighter density liquid from accumulating beyond a predetermined level in the centrifugal filter and allows the centrifuge to be fed at rates significantly higher than the feed rates possible in embodiments of the invention not using such an apparatus.

BRIEF DESCRIPTION OF THE DRAWINGS

FIG. 2 is a side plan view of a centrifugal filter having an internal skimmer tube.

FIG. 3 is a cut away, top plan view of the centrifugal filter of FIG. 2.

DETAILED DESCRIPTION OF THE PREFERRED EMBODIMENTS

Figure 1:
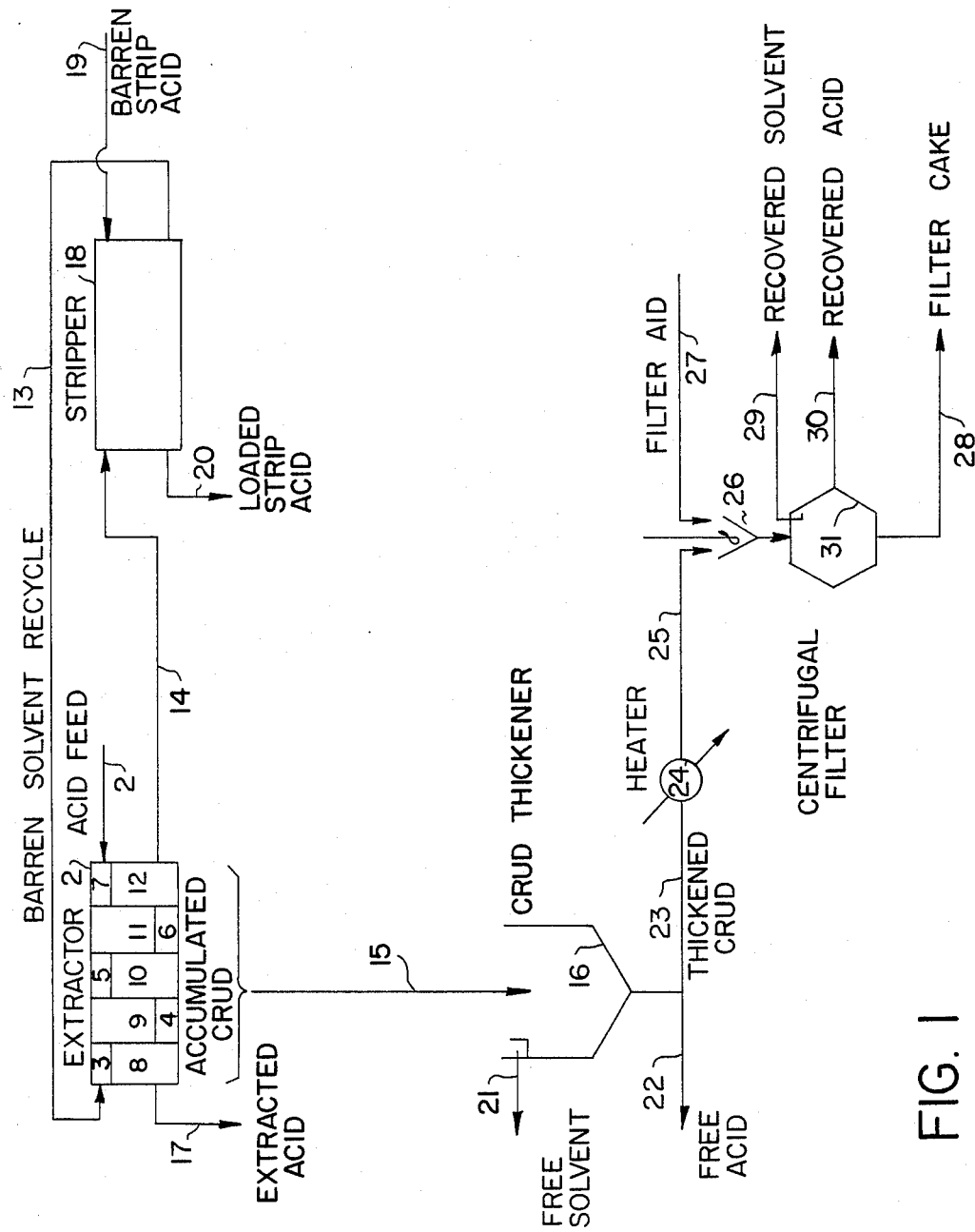
FIG. 1 is a flow diagram of the invented process as it is used in a solvent extraction system to recover uranium from wet-process phosphoric acid.

The process of the invention is for recovering two liquid phases and a solid phase from an emulsified suspension of solid particles. Such suspensions can be formed during wet process phosphoric acid production. The emulsion is processed to recover the two liquid phases such as the solvent and phosphoric acid found in uranium extraction emulsions. The invented process recovers two liquid phases of different densities from the three phase emulsions. The steps of the process include adding a filter aid either as a precoat or add-mixed aid to the emulsion, centrifuging the emulsion in a centrifugal filter at sufficient speed to separate the emulsion into two liquid phases and a solid phase wherein each of the three separated phases has a different density, and recovering the two separated liquid phases.

Stable three phase emulsions typically contain about 20 percent to about 50 percent by volume of light-density solvent, about 40 percent to about 70 percent by volume of heavy-density liquid such as an acid, and less than about 10 percent by volume of solids. These three phases are separated according to this invention into their three components by using a centrifugal filter operating at sufficient speeds to produce forces up to 1300 times the acceleration of gravity (g's). The value of 1300 g's represents an upper operational limit for commercial equipment that is currently available, therfore, higher values can be used with this invention. In general higher centrifugal forces for the purposes of this invention allow higher feed rates, however, the separation can be accomplished at relatively low values for the acceleration of gravity exerted by the equipment. The preferrable range for the acceleration of gravity exerted by equipment used in this invention is between about 600 and about 1300 g's.

The relationship between a crud treatment system and a solvent extraction plant is shown schematically in FIG. 1. This Figure presents a simplified arrangement for such plants.

According to FIG. 1, a phosphoric acid stream 1 can have, for example, 30 percent $P_2O_5$ phosphoric filter acid. This phosphoric acid stream 1 can contain both uranium values that are to be recovered and crud forming impurities. The phosphoric acid stream 1 is fed into one end of a multi-staged countercurrent extractor unit or extractor 2. Suitable extractors are commercially available. The extractor 2 is composed of multiple "mixers" or mixing compartments 3, 4, 5, 6, and 7 and "settlers" or settling compartments 8, 9, 10, 11, and 12. A solvent recycle stream enters the extractor 2 via a line 13 at one end and moves in a countercurrent flow to the phosphoric acid stream 1. Upon entering the extractor 2, the solvent is "barren" or does not contain uranium. In the multiple mixing compartments 3, 4, 5, 6, and 7 the acid and solvent are mixed and are then fed to the settling compartments 8, 9, 10, 11, and 12 where the acid and solvent phases separate. The mixing of the acid and solvent causes the uranium values to be extracted from the acid and to enter the solvent stream. The solvent stream is now referred to as being "loaded" because it contains the uranium values.

The loaded solvent stream exits the extractor 2 by a line 14. Within the extractor 2, crud is formed in the mixing compartments 3, 4, 5, 6, and 7 and collects in the settling compartments 8, 9, 10, 11, and 12. Periodically the crud that has collected in the settling compartments 8, 9, 10, 11, and 12 is flushed via a line 15 to a crud thickener 16. The acid stream, from which uranium values have been extracted, leaves the extractor 2 by a line 17 and undergoes further processing before it is marketed as wet process phosphoric acid. The further processing of the acid can include evaporation, clarification, and other process steps that are standard within the industry.

The loaded solvent leaves the extractor 2 by the line 14 and passes to a stripper 18 in which the uranium-rich loaded solvent is stripped of its uraniua values by contact with barren strip acid 19. The barren strip avoid 19 is phosphoric acid to which divalent iron has been introduced to make an effective stripping solution. Phosphoric acids suitable for forming a strip acid can have a 30 percent $P_2O_5$ phosphoric acid content. The strip acid 19, which is now loaded with uranium, leaves the stripper 18 by a line 20 and undergoes further processing to recover the uranium values. The barren solvent which has been stripped of its uranium values exits the stripper 18 by the line 13.

The crud flushed via a line 15 to crud thickener 16 contains large quantities of "free" solvent and acid in addition to the solvent and acid that is tightly bound in the stable crud emulsion. The free solvent and acid is separated from the emulsion in crud thickener 16 by simple gravity settling. The free solvent and acid recovered in the crud thickener 16 are returned to the main process, respectively, by a line 21 and a line 22.

To this point the process described regarding FIG. 1 is essentially a standard process for manufacturing wet-process phosphoric acid wherein crud is formed. This description demonstrates the relationship between the claimed invention and a typical crud handling circuit for a plant extracting uranium from wet process phosphoric acid. At this point in a typical crud handling circuit, the bulk of the free acid and solvent have been removed, however, substantial amounts of solvent and acid remain. This remaining solvent and acid is tightly bound to solids in the three phase emulsion as previously described. The following process steps are used to recover this tightly bound solvent and acid from the crud emulsion.

The crud emulsion exits the crud thickener by a line 23 and passes to a heater 24 where the emulsion is heated, if necessary, to maintain the temperature at or above that temperature at which the crud was formed. In the case of crud formed during solvent extraction from phosphoric acid the preferred temperature range is 110° F. (43° C.) to 170° F. (77° C.). Higher temperatures generally mean higher feed rates, however, care must be taken to maintain the temperature well below the flash point of the solvent. The preferred temperature is that of the solvent extraction circuit where the emulsion was formed. The process can be carried out at lower temperatures. However, as with most solid-liquid separations, the subsequent separation rate decreases as the temperature decreases. Heating can be performed by conventional direct or indirect methods. Direct steam injection is particularly efficient, but indirect heat exchangers are also satisfactory.

The hot crud emulsion passes from the heater 24 by a line 25 to a mixer 26 where an appropriate filter aid is added by a line 27. Filter aids can include numerous fine crystalline solids. For the purposes of the most desirable embodiments of this invention the the filter aid is not very soluble in acids. Suitable filter aids can include a member selected from the group consisting of gypsum, granulated carbon, granulated silicates, diatomaceous earth, and crushed volcanic ash. Gypsum is desirable because it is an inexpensive waste product of the wet phosphoric acid process. Commercially available diatomaceous earths, such as that sold under the trade name "Diatomite", are excellent filter aids for this invention. Commercially available crushed volcanic ash is the most desirable filter aid because it is inexpensive and particularly effective. An example of a crushed volcanic ash is that sold under the trade name "Perlite" which is sold by the Filter-Media Company, P.O. Box 19156, Houston, Tex. The filter aid can be added as a pre-coat or mixed in-line with the emulsion just prior to centrifugation in a centrifugal filter 31. When the filter aid is mixed in-line this mixing is known as "body feeding."

When the filter aid is added as a pre-coat, a layer of filter aid from about ⅛ inch (0.3175 centimeter) to about ¼ inch (0.635 centimeter) is sufficient to produce a clear filtrate. To perform this operation a slurry of the chosen filter aid is generally prepared for addition to the hot crud emulsion and is sprayed onto the filter cloth of a centrifuge during a pre-coat operation of the centrifugation cycle. An appropriate concentration of the slurry aid is determined by the chemical composition that is chosen and the particle size for that filter aid. Typically, filter aids such as diatomaceous earth are formed into an aqueous slurry of a concentration of up to about 5 percent. The average particle size of a filter aid such as diatomaceous earth is desirably from about 20 microns to about 150 microns with the most desirable average pore size being about 50 microns.

An appropriate filter cloth for use in this invention can vary greatly. Suitable filter cloths can include synthetic fabrics, such as those made of a polypropylene that can resist the temperatures of the process, and stainless steel. Stainless steel is the preferred filter cloth. Certain filter cloths such as those made of nylon and polyethylene are less than desirable because the presence of solvents decomposes these cloths. The size of the mesh of the filter cloth can be any size that allows for effective filtration. The most desirable mesh size is that having an industry standard for an air permeability measurement of from about 100 to about 400 cubic feet per minute.

In a body feeding operation, which is preferred, a filter aid is added as a thick water slurry directly to the emulsion in an amount approximately equal to the weight percent of solids contained in the emulsion. The advantage of mixing the filter aid with the emulsion is that the resulting filter cake is more porous. Increased porosity enables higher feed rates and dryer filter cakes. In the body feed mode, when dry filter cakes are obtained, the cake is simply reslurried with water and disposed of via a line 28. Alternatively, in the pre-coat mode, when relatively wet filter cakes are obtained, additional solvent can be recovered by chemically treating the cake by such methods as those described in U.S. Pat. No. 4,190,633. The recovered solvent and acid are returned to the main process, respectively, via a line 29 and a line 30.

When feeding the previously described three phase emulsion into a centrifugal filter at rates below the maximum filtration rate, both liquid phases pass freely through the filter cake with little or no accumulation of liquid within the centrifuge. A maximum filtration rate for purposes of this invention is defined as the highest filtration rate, wherein other operating conditions are held constant, at which there is no build-up of liquid phases within the centrifugal filter. As the filter cake compacts, the feed rate of the emulsion can potentially exceed the maximum filtration rate. In such a case, the heavy-phase liquid continues to pass freely through the cake while the light phase liquid begins to accumulate on the inside of the centrifuge.

An apparatus according to this invention comprises a centrifugal filter having a "skimmer tube" or pipe that is positioned to withdraw or remove the accumulated light phase liquid. The light phase liquid can be continuously removed as clarified overflow, while the heavy-phase liquid is continuously removed as clarified filtrate and the solids are retained within the centrifuge until their automatic discharge. When this apparatus is used, the feed rate to the centrifugal filter is controlled by the sedimentation rate of the solids rather than the relatively slow filtration rate of the light phase liquid. This permits feed rates that are much higher than the filtration rate and shortens the spin cycle of the centrifugal filter. For purposes of this invention the "spin cycle" for the centrifugal filter is the operational period of the centrifugal filter. This period includes the start-up and slow-down period of "spin" in addition to the operational period or "feed" cycle of spin wherein the centrifugal filter is at its desired operational speed or revolutions per minute and is receiving feed and/or processing feed within the filter or centrifuge basket.

The apparatus of the most desirable embodiment of of this invention uses a commercially available centrifuge having a 48 inch (122 centimeter) diameter with a basket having a 30 inch (76 centimeter) depth. This centrifuge provides a filter area of about 32 square feet (3 square meters). The three phase emulsion is desirably fed to the centrifuge at a rate of about 6 gallons per minute (23 liters per minute) that equates to a feed rate of about 0.15 to about 0.3 gallon per minute per square foot (about 7.5 liters per minute per square meter) of filter area. This feed rate can be varied greatly. This feed rate is desirable because it yields an average feed cycle time for the centrifuge of about 1 hour when a three phase emulsion is being processed that has less that about 10 percent solids by volume.

Other feed rates for the crud or emulsion can be used with the preferred apparatus of this invention. Faster feed rates can fill the basket with solids more rapidly. This causes the spin cycle to be shortened and can increase the rate of wear for the centrifuge by potentially increasing the number of times the centrifuge is accelerated and deaccelerated to empty the solids from the basket. Slower feed rates of the emulsion produce longer spin cycle times, but are potentially not capable of sufficient throughput of emulsion to adequately process the volume of crud or emulsion produced by the preferred system as described above. The percent of solids in the emulsion being processed also varies the cycle time of the apparatus.

The apparatus according to the invention avoids splashing, loss of liquid during solids discharge, and enables flexibility in maintaining the desired depth of solvent level by using at least one internal skimmer tube placed within the centrifuge basket as shown in FIG. 2. This invention includes the unique arrangement of a skimmer tube with a centrifugal filter such as a perforate basket centrifuge. This apparatus allows for a three phase separation of the emulsion described above. The skimmer tube can continuously remove clarified liquid with little or no splashing, while maintaining the desired solvent depth.

The use of a centrifigal filter having a skimmer tube is extremely valuable in processes wherein the feed rates of the emulsion are above the maximum filtration rate of the three phase feed solution. At the beginning of the filtration cycle of such processes, the use of a skimmer tube is not necessary. As the filtration proceeds, however, the use of the skimmer tube becomes increasingly desirable. Such an apparatus is not necessary in processes wherein the feed rates of the emulsion are below the maximum filtration rate.

The apparatus of this invention is depicted in FIG. 2. The apparatus has a centrifugal filter 31 that desirably rotates within a housing wall 107 at a sufficient speed to provide about 600 to about 1300 g's of centrifugal force. The centrifugal force separates the phases of the emulsion into the three phases or layers which are the high density acid solution, the low density solvent, and the solid. The high density acid phase passes freely through the filter cake 101, the filter cloth 102, and the perforated cylinder wall 103 of the drum-like or cylindrical basket 108, and is discharged from the centrifugal filter 31 via a stationary filter drain or exit pipe 106. The solid phase is retained on the filter cake 101. The low-density solvent phase or solvent 104 is allowed to build up to a the level at which the solvent 104 enters the inlet opening of a skimmer tube 105. The momentum imparted to the solvent 104 by the rotation of the centrifugal filter 31 forces the solvent 104 to exit the centrifugal filter 31 via the skimmer tube 105.

The perforated or cylindrical basket 108 is rotatable by any suitable means for rotating (not shown) that can achieve the desired speed. Such a means for rotating can be a commercially available motor. The speed of the rotation of the perforated or cylindrical basket 108 is desirably adjustable. It is desirable if the feed rate of the emulsion is also adjustable. The relative feed rate of the emulsion to the speed of the cylindrical basket in the preferred embodiment of the invention maintains a flow of heavy-density liquid through the perforated cylinder wall 103 for removal or withdrawal through the exit pipe 106 without passing light-density liquid through the perforated cylinder wall 103. The speed of the means for rotating and/or the rate of feed can be manually controlled or controlled by an automated means such as a computer.

Skimmer tube 105 can have the form of any arrangement of tubing or piping sized and positioned to handle the rate of solvent being separated from the crud emulsion in the centrifugal filter 31. Desirably the skimmer tube is made from a material that is resilient to the temperatures existing in the centrifuge and the chemical characteristics of the materials being processed. Stainless steels are desirable resilient materials for manufacturing skimmer tubes according to this invention.

A skimmer tube for the preferred embodiment of this invention is illustrated in FIG. 3. The skimmer tube 105 is desirably fashioned from about $\frac{1}{2}$ inch (1.27 centimeter) to about 1 inch (2.54 centimeters) pipe. The skimmer tube 105 is projected into the centrifuge at an angle that is radial to the circle of rotation of the perforated basket or cylinder wall 103. The terminal portion of the skimmer tube 105 is desirably bent in an elbow such that about 3 inches (7.5 centimeters) of the terminal portion of the skimmer tube 105 is adapted to form an arm or an "extension" of the skimmer tube 105. The extension of the skimmer tube 105 from the elbow is desirably adapted to be at a tangent to the circle of rotation of the perforated basket wall 103 or at an approximate tangential angle to the perforated basket wall 103. The tangential arrangement for the terminal portion of the skimmer tube 105 allows the force of the rotating liquid to push the liquid into the skimmer tube 105. This arrangement eliminates the need for drawing a vacuum in the skimmer tube 105 to remove the liquid. The skimmer tube according to the preferred embodiment of this invention removes from about 1 to about 3 gallons of liquid or solvent per minute (3.5 to 11.5 liters per minute) during normal operations. Bursts of liquid flow through the skimmer tube of up to about 30 gallons per minute (115 liters per minute) can be experienced when a movable skimmer tube is pivoted into the circulating liquid during an operation to remove residual solvent just prior to cutting the filter cake.

Alternative embodiments of the invention can include the use of more than one skimmer tube and the use of movable skimmer tubes in the apparatus of this invention. Multiple skimmer tubes are typically not required in an apparatus for the treatment of crud in wet phosphoric acid plants. This is because the size of the skimmer tube can be modified to remove the amount of solvent being produced in a particular apparatus. It is desirable to have a movable or pivotable skimmer tube. Movable skimmer tubes can be adjusted to remove liquid at different distances from the surface of the filter cake. This is useful when, for example, a small amount of residual liquid needs to be removed from the centrifuge before the collected filter cake of solid matter is cut or purged from the centrifuge.

EXAMPLE 1

Example 1 illustrates a brief laboratory batch test utilizing a small volume of emulsion. In this example of the process of the invention, a skimmer tube is not used. The test illustrates the manner by which the process separates the three phases of a crud emulsion from a wet phosphoric acid process.

A 250 milliliters sample of a stable emulsion was preheated to 150° F. (65° C.) in an baffled beaker with agitation. The emulsion, which contained 24 percent by volume solvent, 70 percent by volume phosphoric acid (which is 27 percent $P_2O_5$), and 6 percent being a mixture of organic and inorganic solids, was obtained from a commercial scale solvent extraction process. To the hot emulsion, 50 grams of a 15 percent by weight aqueous slurry of a volcanic ash filter aid was added. The volcanic ash had an average particle size of 50 microns. After 5 minutes of mixing, the mixture of emulsion and filter aid was fed via a tubing pump to a 5 inch (12.7 centimeter) diameter perforated basket centrifuge which was rotating at 3700 revolutions per minute that produced 1000 g's The mixture was fed at a rate of 0.15 gallons per minute per square foot (6.1 liters per minute per square meter) of filter area. After the entire contents of the mixture was fed into the perforated basket, the filter cake was spun "dry" for 5 minutes.

The products separated from the emulsion included 200 milliliters of diluted phosphoric acid, 53 milliliters of recovered solvent, and 35 grams of moist filter cake containing the equivalent of about 8 milliliters of solvent and 10 milliliters of diluted acid.

EXAMPLE 2

This example illustrates the separation of a crud or emulsion produced in a wet process phosphoric acid plant into its three phases by the invented process. This example also illustrates the use of an apparatus having a skimmer tube. The procedure of this example is the same as Example 1 except that the process is performed with pilot plant size equipment.

A quantity of 500 gallons (1892.5 liters) of freshly generated emulsion were pumped into a 1000 gallon (7,785 liter) agitated tank. The emulsion which contained 28 percent by volume solvent, 67 percent volume acid, and the balance inorganic and organic solids, was heated to 155° F. (68° C.) by direct steam injection. To the hot emulsion were added 650 pounds (295 Kilograms) of a 15 percent by weight aqueous slurry of volcanic ash filter aid. After thorough mixing the mixture of emulsion and filter aid was fed via a centrifugal pump to a 30 inch diameter (76.2 centimeter) by 15 inch (38.1 centimeter) deep perforated basket centrifuge rotating at 1350 revolutions per minute which produced 800 g's. The inlet of a skimmer tube was positioned within the centrifuge. The skimmer tube was constructed of $\frac{1}{2}$ inch (1.27 centimeter) diameter stainless steel tubing. The mixture was fed to the centrifuge at a rate of 0.25 gallons per minute per square foot (10.2 liters per minute per square meter) of filter area. The feed cycle lasted for 45 minutes during which time 114 gallons (431.5 liters) of the mixture were fed to the centrifuge. During the cycle, most of the solvent extracted from the emulsion was removed via the skimmer tube while essentially all the acid passed through the filter cloth and basket wall to exit the centrifuge.

The products collected during this example included 80 gallons (303 liters) of phosphoric acid, 24 gallons (90.8 liters) of solvent and 116 pounds (52.6 Kilograms) of moist filter cake. The filter cake contained the equivalent of 3.5 gallons (13.2 liters) of solvent.

I claim:

1. A process for recovering two liquid phases and a solid phase from an emulsified suspension of solid particles comprising:
   (a) contacting a filter aid with an emulsion, said emulsion having a light-density liquid, a heavy-density liquid and a solid;
   (b) centrifuging said emulsion in a centrifugal filter at sufficient speed
      (i) to collect said solid on a filter surface of said centrifugal filter; and
      (ii) to separate said light-density liquid from said heavy-density liquid, said heavy-density liquid being passed through said filter surface;
   (c) removing said light-density liquid from said heavy-density liquid.

2. The process of claim 1 wherein said sufficient speed of said centrifugal filter is a speed that produces about 600 to about 1300 g's of centrifugal force.

3. The process of claim 1 wherein said light-density liquid is an organic solvent, said organic solvent being suitable for extraction of uranium from a wet process phosphoric acid.

4. The process of claim 3 wherein said high-density liquid is phosphoric acid.

5. The process of claim 1 wherein said filter aid is a member selected from the group consisting of gypsum, granulated carbon, granulated silicates, diatomaceous earth, and crushed volcanic ash.

6. A process for recovering two liquid phases and a solid phase from an emulsified suspension of solid particles formed during wet process phosphoric acid production comprising:
   (a) contacting a filter aid with an emulsion, said emulsion having a light-density solvent, a heavy-density acid and a solid, said emulsion being at a temperature of about 110° F. to about 170° F.;
   (b) feeding said emulsion to a centrifugal filter, said centrifugal filter having:
      (i) a housing wall, said housing wall having at least one stationary exit pipe affixed thereto;
      (ii) a cylindrical basket adapted to rotate within said housing wall, said cylindrical basket having a perforated cylinder wall and a filter cloth within said perforated cylinder wall; and
      (iii) a skimmer tube projecting into said rotatable cylindrical basket, said skimmer tube having an end juxtaposed to said filter cloth;
   (c) centrifuging said emulsion in said centrifugal filter at a speed sufficient to:
      (i) provide about 600 to about 1300 g's of centrifugal force;
      (ii) separate said light-density solvent from said heavy-density acid; and
      (iii) pass said heavy-density acid through said perforated cylinder wall to said housing wall;
   said speed, relative to a rate of feeding of said emulsion, being less than sufficient to pass said light-density solvent through said perforated cylinder; and
   (d) collecting simultaneously said light-density solvent through said skimmer tube, said heavy-density acid through said stationary piping and said solid on said filter cloth.

7. The process of claim 6 wherein said emulsion contains about 20 percent to about 50 percent by volume of said light-density solvent, about 40 percent to about 70 percent by volume of said heavy-density acid, said heavy density acid being phosphoric acid, and less than about 10 percent by volume of said solid.

8. The process of claim 7 wherein said filter aid is a member selected from the group consisting of gypsum, granulated carbon, granulated silicates, diatomaceous earth, and crushed volcanic ash.

9. The process of claim 8 wherein said contacting of said filter aid is as a pre-coat material.

10. The process of claim 8 wherein said contacting of said filter aid is as a body feed material.

11. A process for recovering two liquid phases and a solid phase from an emulsified suspension of solid particles formed during wet process phosphoric acid production comprising:
   (a) contacting a filter aid with an emulsion, said emulsion having a light-density solvent, a heavy-density acid and a solid, said emulsion being at a temperature of about 110° F. to about 170° F.;
   (b) transferring said emulsion to a centrifugal filter, said centrifugal filter having:
      (i) a housing wall, said housing wall having at least one stationary exit pipe affixed thereto; and
      (ii) a cylindrical basket adapted to rotate within said housing wall, said cylindrical basket having a perforated cylinder wall and a filter cloth within said perforated cylinder wall;
   (c) centrifuging said emulsion in said centrifugal filter at a speed sufficient to:
      (i) provide about 600 to about 1300 g's of centrifugal force;
      (ii) separate said light-density solvent from said heavy-density acid; and
      (iii) pass said heavy-density acid through said perforated cylinder wall to said housing wall;
   (d) collecting simultaneously said light-density solvent and said heavy-density acid through said stationary exit pipe and said solid on said filter cloth;
   (e) separating said light-density solvent from said heavy-density acid.

12. The process of claim 11 wherein said emulsion contains about 20 percent to about 50 percent by volume of said light-density solvent, about 40 percent to about 70 percent by volume of said heavy-density acid, said heavy density acid being phosphoric acid, and less than about 10 percent by volume of said solid.

13. The process of claim 12 wherein said filter aid is a member selected from the group consisting of gypsum, granulated carbon, granulated silicates, diatomaceous earth, and crushed volcanic ash.

14. The process of claim 13 wherein said contacting of said filter aid is as a pre-coat material.

15. The process of claim 13 wherein said contacting of said filter aid is as a body feed material.

16. An apparatus for separating three phases from an emusified suspension of particles, comprising:
   (a) a centrifugal filter, said centrifugal filter having:
      (i) a housing wall, said housing wall having a stationary exit pipe affixed thereto suitable for withdrawing a heavy-density liquid;
      (ii) a cylindrical basket adapted to rotate within said housing wall, said cylindrical basket having a perforated cylinder wall and being adapted to support a filter cloth on said perforated cylinder wall; and
      (iii) a skimmer tube projecting into said rotatable cylindrical basket, said skimmer tube having a terminal end juxtaposed to said filter cloth;

(b) a means for rotating said cylindrical basket of said centrifugal filter at a speed sufficient to provide about 600 to about 1300 g's of centrifugal force.

17. The apparatus of claim 16 wherein said skimmer tube is adapted to be pivotable whereby said terminal end of said skimmer tube is selectively positionable in distance from said perforated cylinder wall of said cylindrical basket.

18. The apparatus of claim 17 wherein said terminal portion of said skimmer tube is an extension of an elbow formed in said skimmer tube, said extension being at an approximate tangential angle to said perforated cylinder wall.

* * * * *

UNITED STATES PATENT AND TRADEMARK OFFICE
CERTIFICATE OF CORRECTION

PATENT NO. : 4,759,913

DATED : July 26, 1988

INVENTOR(S) : Headington

It is certified that error appears in the above-identified patent and that said Letters Patent is hereby corrected as shown below:

In the Drawings, Figure 1, the reference number "2" of the "ACID FEED" should read reference number --1--.

Column 5, line 42, "uraniua" should read --uranium--.

Column 5, line 43, "avoid" should read --acid--.

Column 10, line 39 "(7,785 liter)" should read --(3,785 liters)--.

Signed and Sealed this

Eighth Day of December, 1992

Attest:

DOUGLAS B. COMER

Attesting Officer

Acting Commissioner of Patents and Trademarks